US012620185B2

(12) United States Patent　　　　　　(10) Patent No.:　US 12,620,185 B2

Patterson　　　　　　　　　　　　　　　(45) Date of Patent:　　　　May 5, 2026

(54) SYSTEMS AND METHODS FOR GENERATING SUBTRACTIVE CONTRAST IN AN AUGMENTED REALITY DISPLAY

(71) Applicant: Meta Platforms Technologies, LLC, Menlo Park, CA (US)

(72) Inventor: Burkley Delesdernier Patterson, Catonsville, MD (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 159 days.

(21) Appl. No.: 18/391,292

(22) Filed: Dec. 20, 2023

(65) Prior Publication Data

US 2024/0371113 A1　　Nov. 7, 2024

Related U.S. Application Data

(60) Provisional application No. 63/499,610, filed on May 2, 2023.

(51) Int. Cl.
| | |
|---|---|
| *G06T 19/00* | (2011.01) |
| *G06F 3/01* | (2006.01) |
| *G06V 10/60* | (2022.01) |

(52) U.S. Cl.
CPC ............ *G06T 19/006* (2013.01); *G06F 3/013* (2013.01); *G06V 10/60* (2022.01)

(58) Field of Classification Search
CPC .................................................. G06T 19/006
See application file for complete search history.

(56)　　　　　　References Cited

U.S. PATENT DOCUMENTS

| | | | |
|---|---|---|---|
| 2017/0090194 A1* | 3/2017 | Hayes ................ | G02B 27/0101 |
| 2021/0097943 A1* | 4/2021 | Wyatt ........................ | G02F 1/01 |
| 2021/0263310 A1* | 8/2021 | Nicholson ............... | G06F 3/013 |

* cited by examiner

*Primary Examiner* — Shivang I Patel
(74) *Attorney, Agent, or Firm* — Greenberg Traurig, LLP

(57)　　　　　　ABSTRACT

The disclosed computer-implemented system and method may include a dark source that—when applied as part of an augmented reality projector—can temporarily reduce the photosensitivity of a user's eyes. By causing a reduction in photosensitivity, the disclosed systems and methods can project virtual reality objects within an augmented reality display at lower brightness levels than would otherwise be necessary when the augmented reality device is used outdoors and/or in brightly lit environments. Various other methods, systems, and computer-readable media are also disclosed.

20 Claims, 8 Drawing Sheets

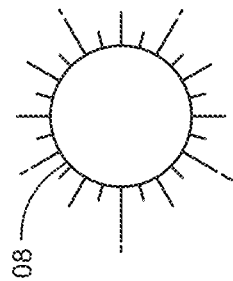
108
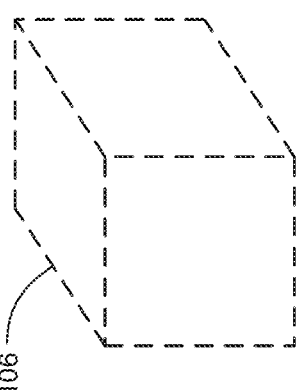
106
102
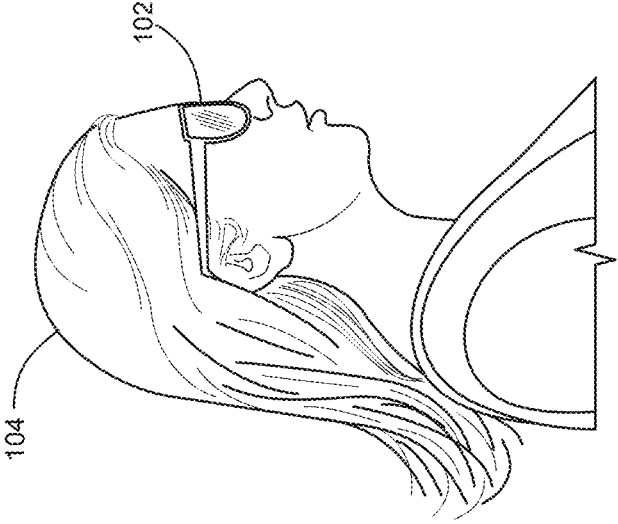
104
FIG. 1

300

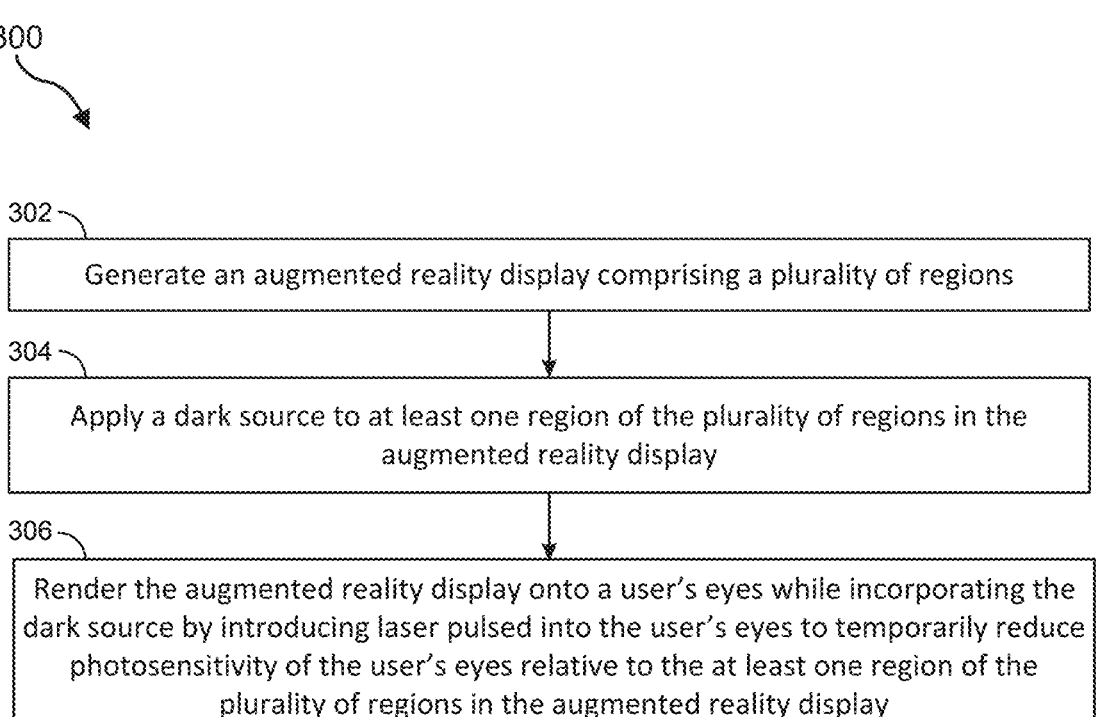

302

Generate an augmented reality display comprising a plurality of regions

304

Apply a dark source to at least one region of the plurality of regions in the augmented reality display

306

Render the augmented reality display onto a user's eyes while incorporating the dark source by introducing laser pulsed into the user's eyes to temporarily reduce photosensitivity of the user's eyes relative to the at least one region of the plurality of regions in the augmented reality display

*FIG. 3*

800
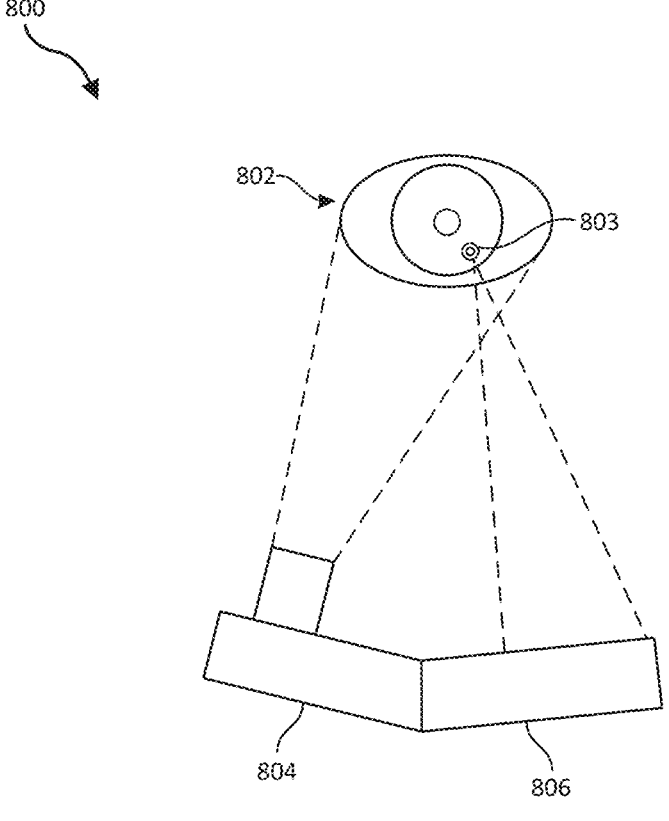
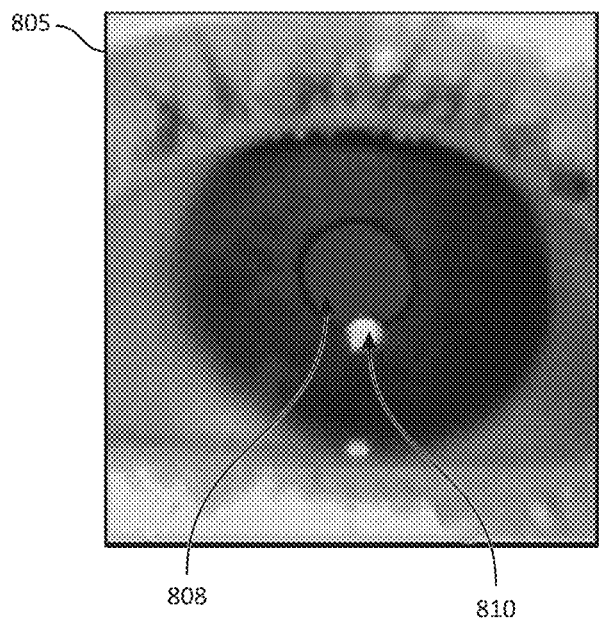
FIG. 8

SYSTEMS AND METHODS FOR GENERATING SUBTRACTIVE CONTRAST IN AN AUGMENTED REALITY DISPLAY

CROSS REFERENCE TO RELATED APPLICATION

This application claims the benefit of U.S. Provisional Application No. 63/499,610, filed 2 May 2023, the disclosure of which is incorporated, in its entirety, by this reference.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 1 illustrates how a conventional augmented reality system operates in environments with brighter light levels.

FIG. 3 illustrates a flow chart of steps performed by the subtractive contrast system while applying a dark source to an augmented reality display to temporarily reduce sensitivity in different regions of the user's retina in accordance with one or more implementations discussed herein.

FIG. 8 is a more detailed illustration of various aspects of the eye-tracking subsystem illustrated in FIG. 7.

Figure 2:
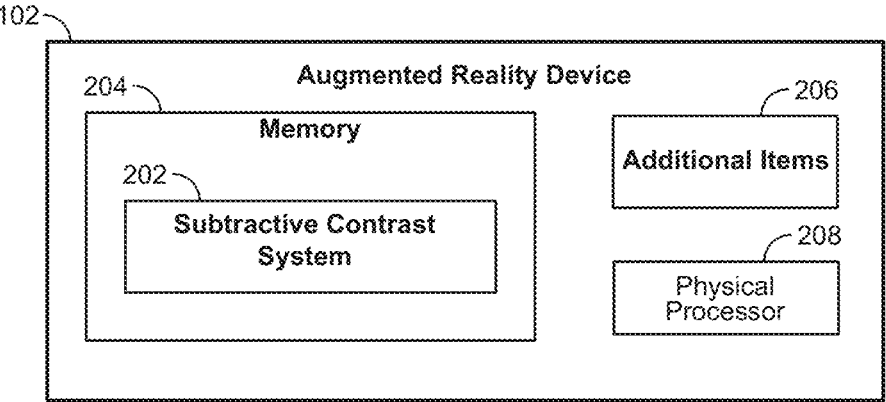
FIG. 2 illustrates an overview of a subtractive contrast system in accordance with one or more implementations discussed herein.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claim.

DETAILED DESCRIPTION OF EXEMPLARY EMBODIMENTS

Augmented and virtual reality systems are increasingly commonplace. For example, an augmented reality system can project virtual reality objects into a user's eyes (e.g., via a pair of augmented reality glasses) such that the user views the virtual reality objects overlaid on the environment within the user's natural gaze. While such augmented reality (AR) systems generally present clear and bright AR objects while a user is indoors or in darker environments (e.g., in the shade), typical AR systems suffer multiple shortcomings when used in environments with brighter light levels.

To illustrate, FIG. 1 shows a user 104 wearing an augmented reality device 102 (e.g., a pair of augmented reality glasses) to view a virtual reality object 106 while outdoors. As further shown in FIG. 1, the virtual reality object 106 appears dim (e.g., indicated by the dashed lines) when viewed via the augmented reality device 102 in light from a bright light source 108 (e.g., direct sunlight). In order to ensure that the virtual reality object 106 can be seen at all by the user 104, the augmented reality system operating within the augmented reality device 102 must project the virtual reality object 106 at a very bright level. Projecting at such levels of brightness, however, can create a power drain within the augmented reality device 102 which—in turn—reduces the battery life of the augmented reality device 102.

To remedy these issues, the present disclosure describes a subtractive contrast system that introduces laser light into the user's eyes to temporarily modulate the sensitivity of the user's photoreceptors. By reducing photoreceptor sensitivity, the subtractive contrast system can temporarily make the environment viewed by the user appear darker such that virtual reality objects viewed within that environment appear brighter. In this way, the subtractive contrast system can project virtual reality objects at lower brightness levels with less power output. This can result in longer battery life and extended usage periods associated with augmented reality devices where the subtractive contrast system is implemented.

Features from any of the implementations described herein may be used in combination with one another in accordance with the general principles described herein. These and other implementations, features, and advantages will be more fully understood upon reading the following detailed description in conjunction with the accompanying claim.

Figure 4B:
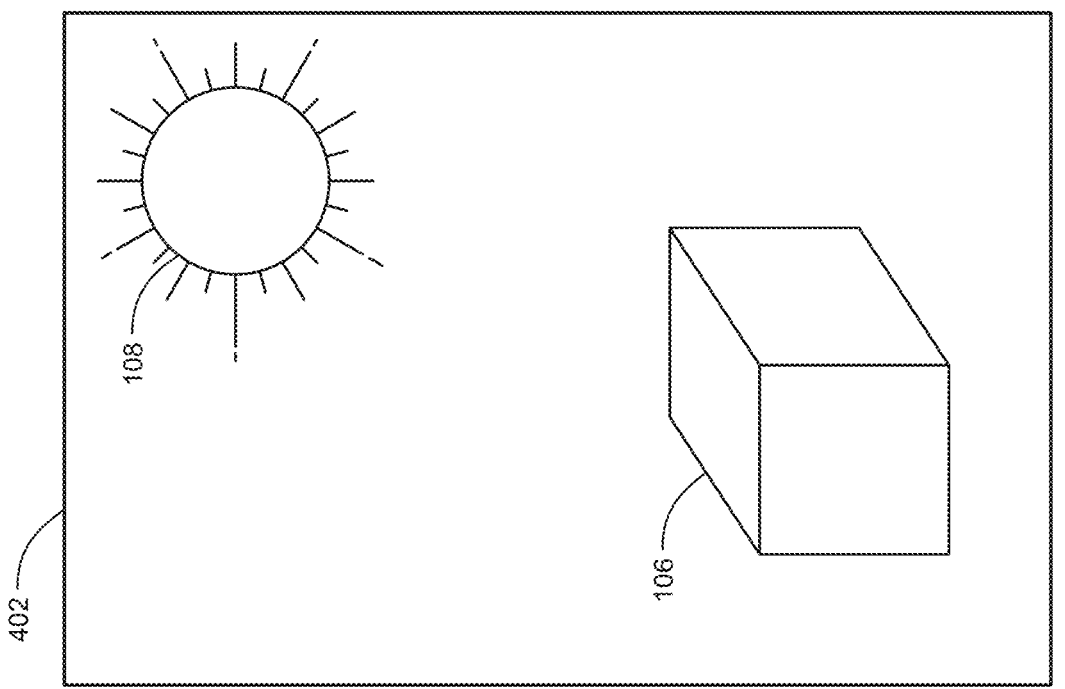
FIGS. 4A and 4B illustrate how the subtractive contrast system makes virtual reality objects easier to see when brighter direct light exists in an environment surrounding an augmented reality device worn by a user in accordance with one or more implementations discussed herein.
Figure 4A:
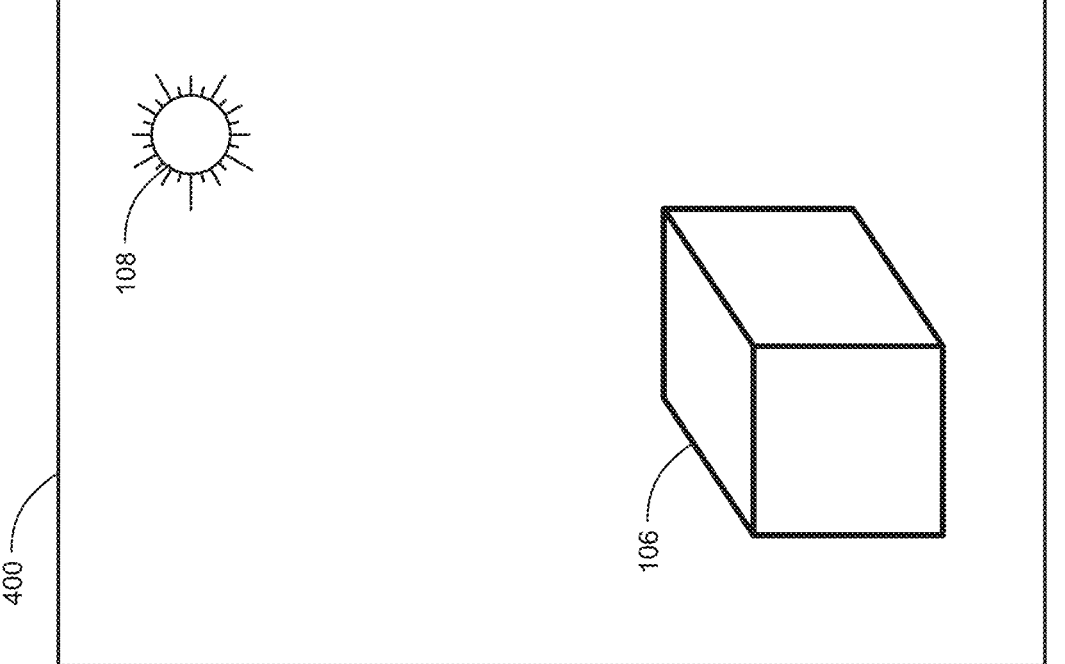
Figure 5:
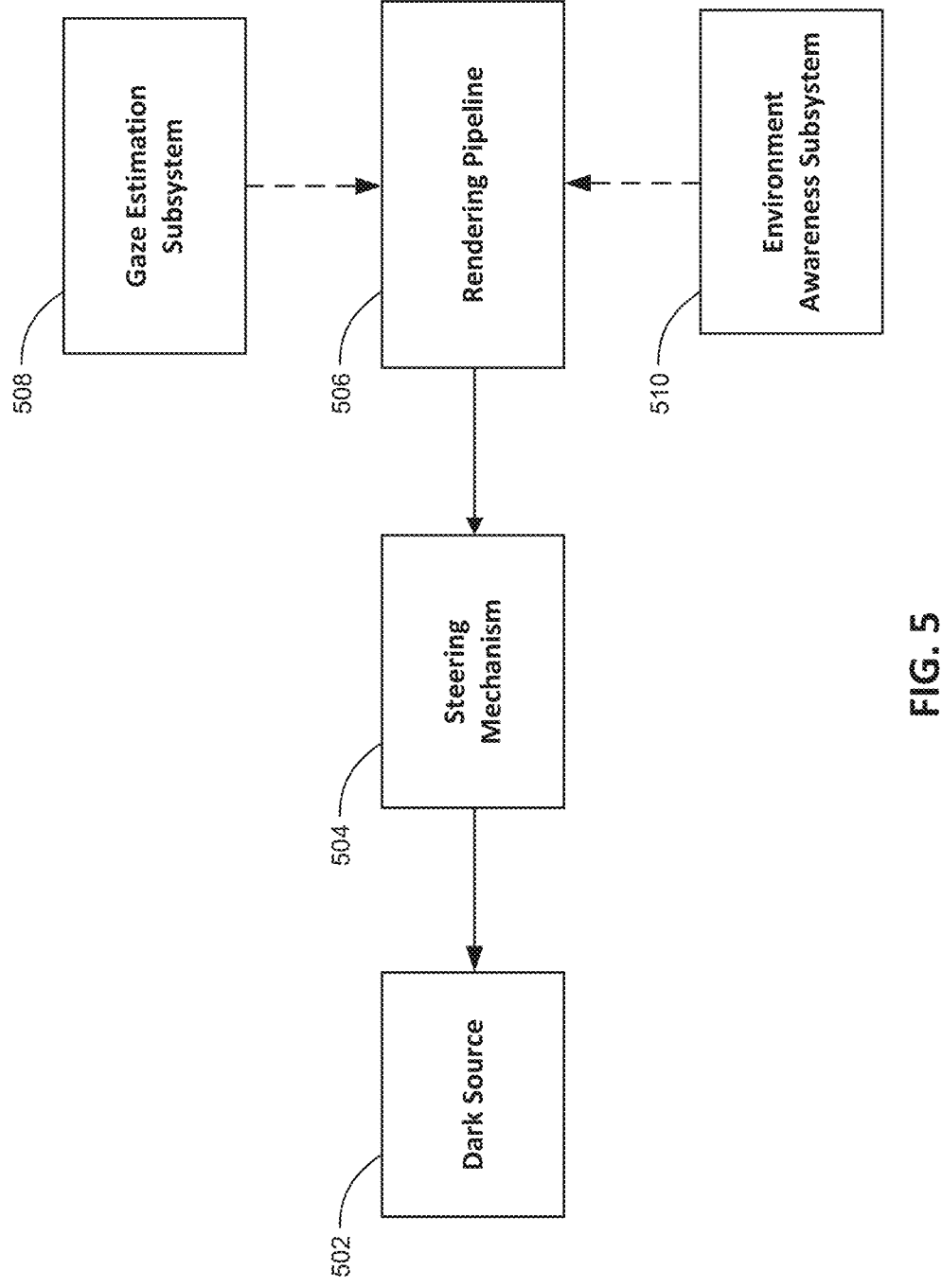
FIG. 5 illustrates components and subsystems of the subtractive contrast system in accordance with one or more implementations discussed herein.
Figure 6:
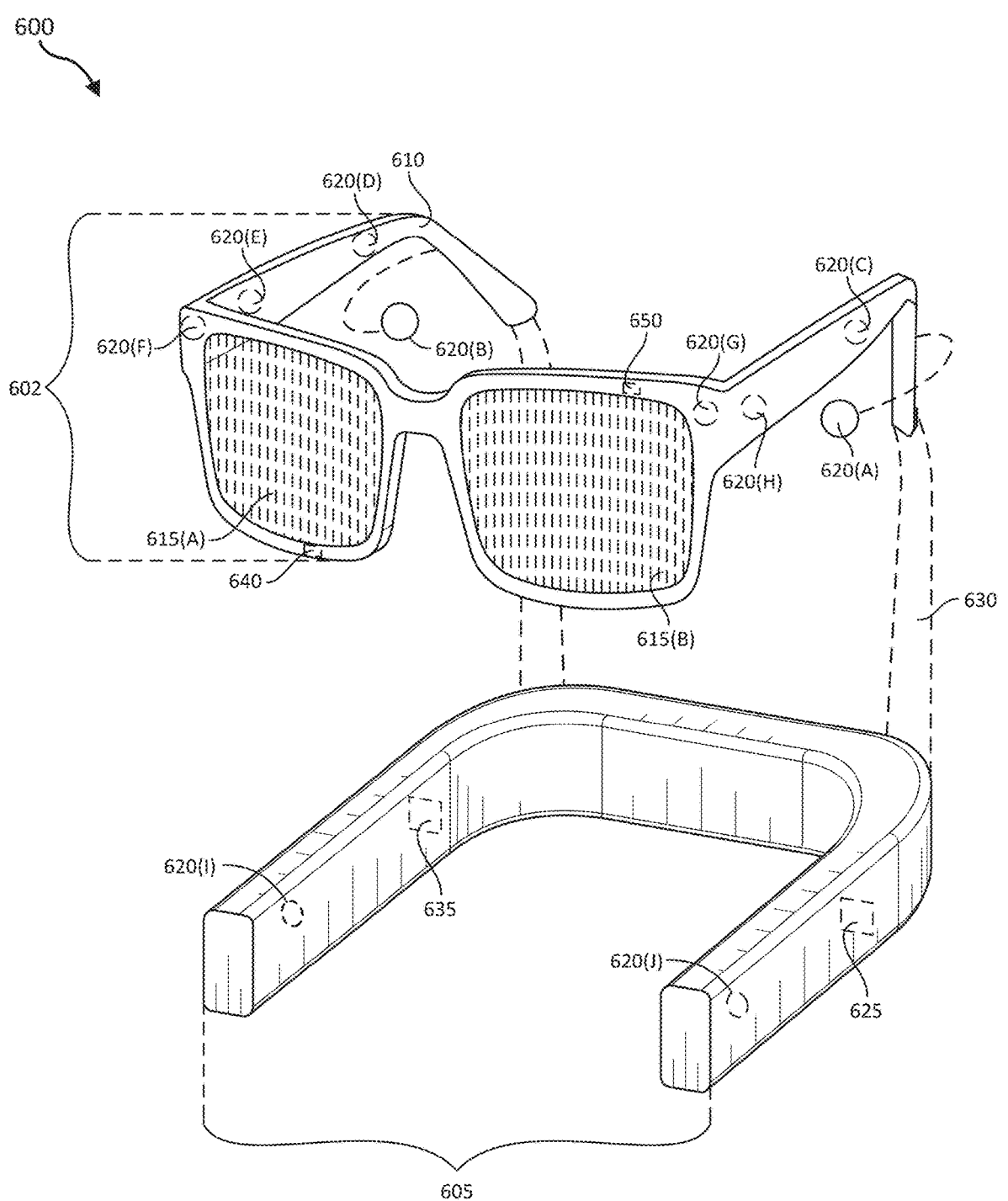
FIG. 6 is an illustration of exemplary augmented-reality glasses that may be used in connection with embodiments of this disclosure.
Figure 7:
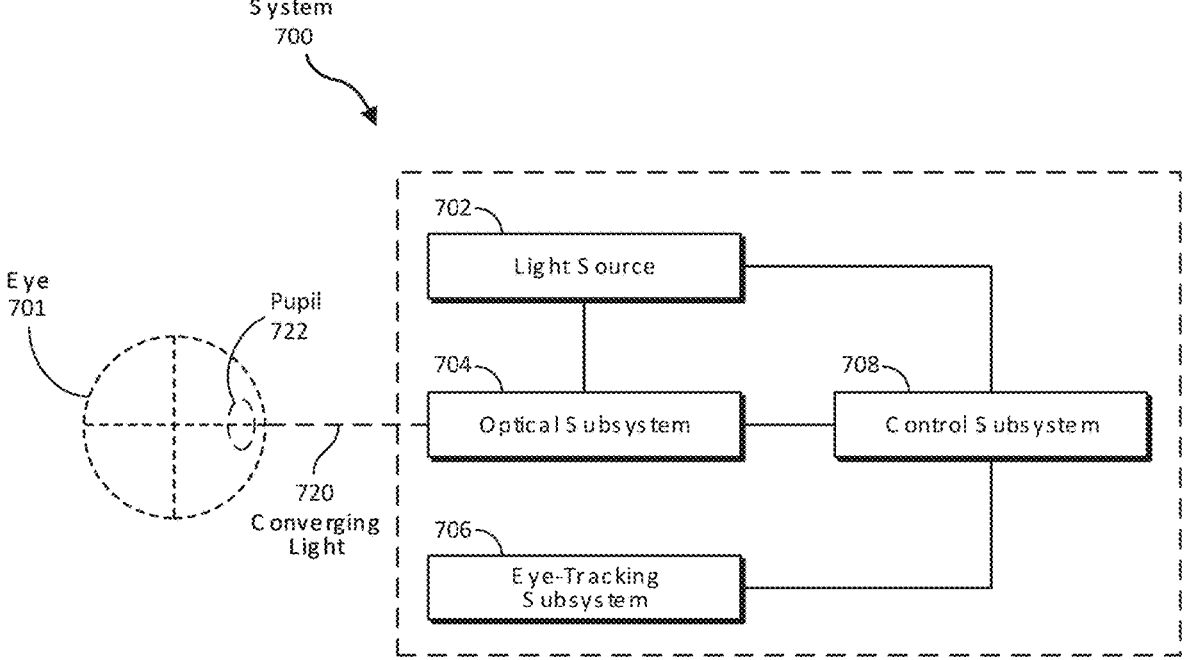
FIG. 7 is an illustration of an exemplary system that incorporates an eye-tracking subsystem capable of tracking a user's eye(s).

As mentioned above, typical augmented reality systems have to compete with light levels within the environment being viewed by a user. Rather than increasing the brightness level of virtual reality objects projected by an augmented reality device, the subtractive contrast system described herein can add a dark source (e.g., an alpha channel or fourth channel) to a red/green/blue (RGB) projector that effectively "subtracts" light from a user's eyes by temporarily reducing the photosensitivity of the user's eyes relative to one or more regions of an AR display. As such, the remaining FIGS. 2-8 provide additional detail with regard to how the subtractive contrast system generates and applies the dark source. For example, FIG. 2 illustrates additional detail with regard to the subtractive contrast system as it operates within the augmented reality device 102. FIG. 3 illustrates steps taken by the subtractive contrast system in applying a dark source within an augmented reality display, and FIGS. 4A-4B illustrate the effect of the dark source on the projection of the virtual reality object 106 in an environment including the bright light source 108. FIG. 5 illustrates additional detail with regard to a steering mechanism employed by the subtractive contrast system in applying the dark source. FIGS. 6-8 illustrate additional detail with regard to augmented reality devices and systems.

As just mentioned, FIG. 2 illustrates the augmented reality device 102 implementing aspects of the present disclosure. For example, the augmented reality device 102 can include a subtractive contrast system 202 operating within a memory 204. Moreover, the augmented reality device 102 can also include additional items 206 and a physical processor 208.

In one or more implementations, the subtractive contrast system 202 can introduce a dark source including deep blue wavelength laser into the alpha channel that briefly reduces sensitivity in different regions of the user's retina. More specifically, by introducing certain laser wavelengths and waveforms into the user's retina, the subtractive contrast system 202 can temporarily modulate the sensitivity of the photoreceptors in the user's eyes. Thus, using conventional augmented reality projector architectures, the subtractive contrast system 202 can paint the user's retina with this laser light to apply subtractive contrast using ambient light.

In one or more implementations, the augmented reality device 102 can be any type of augmented reality device. For example, the augmented reality device 102 can be a head-mounted device such as glasses—that include one or more optical projection systems. Additionally, the augmented reality device 102 can include one or more rendering sub-systems for rendering augmented reality displays for projection onto a user's or wearer's eyes.

In certain implementations, the subtractive contrast system 202 may represent one or more software applications or programs that, when executed by a computing device, may cause the computing device to perform one or more tasks. For example, and as will be described in greater detail below, components of the subtractive contrast system 202 may represent software stored and configured to run on one or more computing devices, such as the augmented reality device 102. One or more of the components of the subtractive contrast system 202 shown in FIG. 2 may also represent all or portions of one or more special purpose computers to perform one or more tasks.

As further shown in FIG. 2, the augmented reality device 102 can include one or more physical processors, such as the physical processor 208. The physical processor 208 generally represents any type or form of hardware-implemented processing unit capable of interpreting and/or executing computer-readable instructions. In one implementation, the physical processor 208 may access and/or modify one or more of the components of the subtractive contrast system 202. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the augmented reality device 102 can include the memory 204. In one or more implementations, the memory 204 generally represents any type or form of volatile or non-volatile storage device or medium capable of storing data and/or computer-readable instructions. In one example, the memory 204 may store, load, and/or maintain one or more of the components of the subtractive contrast system 202. Examples of the memory 204 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 2, the augmented reality device 102 can include additional items 206. On the augmented reality device 102, the additional items 206 can include the augmented reality data such as environmental brightness levels, virtual reality object data, projection data, dark source data and so forth.

As mentioned above, FIG. 3 is a flow diagram of an exemplary computer-implemented method 300 for applying a dark source to an augmented reality display to temporarily reduce sensitivity in different regions of the user's retina—thereby making it possible to project an augmented reality display at lower brightness levels. The steps shown in FIG. 3 may be performed by any suitable computer-executable code and/or computing system. In one example, each of the steps shown in FIG. 3 may represent an algorithm whose structure includes and/or is represented by multiple sub-steps, examples of which will be provided in greater detail below.

As illustrated in FIG. 3, at step 302 the subtractive contrast system 202 can generate an augmented reality display comprising a plurality of regions. For example, the subtractive contrast system 202 can generate the augmented reality display including a region surrounding every virtual reality object within the augmented reality display. In additional implementations, the subtractive contrast system 202 can separate the augmented reality display into equally sized regions, where each region may or may not include a virtual reality object.

As further illustrated in FIG. 3, at step 304 the subtractive contrast system 202 can apply a dark source to at least one region of the plurality of regions in the augmented reality display. For example, in some implementations, the subtractive contrast system 202 can determine a viewing direction of the user's eyes relative to an environment surrounding the augmented reality device and apply the dark source based on the user's viewing direction (e.g., when the user's viewing direction indicates that the user is looking at a virtual reality object). In additional implementations, the subtractive contrast system 202 can apply the dark source based on light levels of the surrounding environment. In one or more implementations, the dark source includes an additional channel in an RGB augmented reality projector housed within the augmented reality device.

Moreover, as illustrated in FIG. 3, at step 306 the subtractive contrast system 202 can render the augmented reality display onto a user's eyes while incorporating the dark source by introducing laser pulsed into the user's eyes to temporarily reduce photosensitivity of the user's eyes relative to the at least one region of the plurality of regions in the augmented reality display. In one or more implementations, the temporary modulation of photosensitivity within the user's eyes makes the environment viewed by the user appear darker-making any virtual reality objects overlaid on that environment appear brighter.

FIGS. 4A and 4B illustrate the effects of the dark source when applied to an augmented reality display that is projected onto a user's eyes. To illustrate, as shown in FIG. 4A, the subtractive contrast system 202 can pulse a laser with one or more wavelengths and waveforms into the eyes of a user viewing the environment 400 as part of an augmented reality display including the virtual reality object 106. For example, the subtractive contrast system 202 can pulse the laser to reduce the photosensitivity of the user's eyes such that the environment 400 is dimmed (e.g., indicated by the reduced light from the light source 108) to the point that the virtual reality object 106 is easily viewed (e.g., indicated by bold lines). In the implementation shown in FIG. 4A, the subtractive contrast system 202 may apply the dark source (e.g., the pulsed laser) such that the environment 400 (e.g., anything that exists around the user wearing the augmented reality device 102) is dimmed to the point that only the virtual reality object 106 is viewable.

In another implementation, as further shown in FIG. 4B, the subtractive contrast system 202 can modulate the laser pulses such that the environment 402 is dimmed to a lesser extent (e.g., indicated by the slightly larger light source 108) such that anything the environment 402 is still viewable while the virtual reality object 106 still appears brighter than it would with a conventional augmented reality system.

In this way, the subtractive contrast system 202 applies the dark source such that the augmented reality display laser(s) needs to provide enough power to modulate the user's photoreceptors, rather than providing enough power to compete with ambient light within either of the environments 400 or 402. It follows that the subtractive contrast system 202 can increase the effective brightness and contrast of an augmented reality display as ambient light becomes brighter within the environment surrounding an augmented reality device (e.g., such as the augmented reality device 102). In additional implementations, the subtractive contrast system 202 can include different types of light as the dark source to introduce subtractive contrast within an augmented reality display. For example, the subtractive contrast system 202 can include ultraviolet light as the dark source within an augmented reality projector.

In one or more implementations, as discussed above, the subtractive contrast system 202 can apply a dark source to an augmented reality display device to reduce the photosensitivity of a user's eyes as the user views an environment overlaid with virtual reality objects. In at least one implementation, the subtractive contrast system 202 can include additional elements and subsystems to apply the dark source effectively and accurately. For example, as shown in FIG. 5, the subtractive contrast system 202 can include the dark source 502. As mentioned above, the dark source 502 can include a fourth channel (e.g., an alpha channel) in an RGB display generator that pulses various waveforms and/or wavelengths of deep blue light into regions of the user's retina to reduce the photosensitivity of those regions.

To accurately apply the dark source to the user's retina, the subtractive contrast system 202 can further include a steering mechanism 504. For example, the steering mechanism 504 can direct the dark source to regions of the user's retina based on placements of one or more virtual reality objects (e.g., the virtual reality object 106) that are to be rendered into an augmented reality display. As discussed above, the steering mechanism 504 can direct the dark source to regions of the user's retina that result in dimming of the entire environment (e.g., such as the environment 400 or the environment 402 shown in FIGS. 4A and 4B, respectively). Additionally or alternatively, the steering mechanism 504 can direct the dark source to regions of the user's retina such that a dim halo exists around the virtual reality objects while the remainder of the surrounding environment appears unchanged within the augmented reality display.

Moreover, as shown in FIG. 5, the subtractive contrast system 202 can include a rendering pipeline 506 that renders the augmented reality display incorporating the dark source. For example, the rendering pipeline 506 can render the virtual reality objects into the augmented reality display viewed by the user at brightness levels that correlate with the reduced retinal photosensitivity created by the dark source.

In one or more implementations, the subtractive contrast system 202 can optionally include a gaze estimation subsystem 508 and an environment awareness subsystem 510. For example, the gaze estimation subsystem 508 can utilize one or more eye tracking methodologies to determine a direction of the user's eyes relative to the surrounding environment. Moreover, the environment awareness subsystem 510 can include one or more externally facing cameras to determine light levels of the surrounding environment. Based on the direction of the user's eyes and the light levels of the surrounding environment, the subtractive contrast system 202 can apply subtractive contrast to certain areas of an augmented reality display to effectively brighten those areas. Additionally, in some implementations, the subtractive contrast system 202 can apply additive contrast to additional areas of the augmented reality display to effectively darken those areas. In this way, the subtractive contrast system 202 can utilize the dark source 502 in concert with additive contrast to evenly illuminate all regions of an augmented reality display.

In summary, the subtractive contrast system 202 solves the power drain problem that conventional augmented reality systems experience when projecting augmented reality displays over environments with brighter light levels. As discussed above, the subtractive contrast system 202 discussed herein applies a dark source (e.g., an additional channel in an RGB augmented reality projection) that temporarily modulates a user's photoreceptors. In one or more implementations, the subtractive contrast system 202 applies the dark source in a targeted manner based on environmental light levels and the user's gazing direction. As a result, the subtractive contrast system 202 makes virtual reality objects within an augmented reality display appear brighter and easier to see against an environment that is illuminated by brighter light levels—while utilizing lower power levels than would otherwise be needed to simply project the virtual reality objects at higher illumination levels.

EXAMPLE IMPLEMENTATIONS

Example 1: A subtractive contrast system for intelligently modulating the photosensitivity of a user's eyes may include a dark source that introduces laser pulses into a user's eyes to temporarily reduce photosensitivity of the user's eyes, a steering mechanism that applies the dark source to one or more regions of an augmented reality display, and a rendering pipeline that renders the augmented reality display onto the user's eyes while incorporating the dark source.

Example 2: The subtractive contrast system of Example 1, further including a gaze estimation subsystem that determines a viewing direction of the user's eyes relative to a surrounding environment.

Example 3: The subtractive contrast system of any of Examples 1 and 2, further including an environment awareness subsystem that determines light levels of a surrounding environment.

Example 4: The subtractive contrast system of any of Examples 1-3, wherein the dark source comprises an additional channel in an RGB augmented reality projector.

Example 5: The subtractive contrast system of any of Examples 1-4, wherein the steering mechanism applies the dark source to at least one of the one or more regions of the augmented reality display that correspond to placement of one or more virtual reality objects within the augmented reality display.

Example 6: The subtractive contrast system of any of Examples 1-5, wherein the steering mechanism applies the dark source to the at least one of the one or more regions of the augmented reality display that correspond to the placement of the one or more virtual reality objects within the augmented reality display by applying the dark source such that a dim halo appears to exist around the one or more virtual reality objects while a remainder of a surrounding environment appears unchanged within the augmented reality display.

Example 7: The subtractive contrast system of any of Examples 1-6, further including an additive contrast subsystem that decreases a brightness level of one or more additional regions of the augmented reality display such that all regions of the augmented reality display are evenly illuminated by the dark source in concert with the additive contrast subsystem.

Example 8: A method for intelligently modulating the photosensitivity of a user's eyes may include generating an augmented reality display comprising a plurality of regions, applying a dark source to at least one region of the plurality of regions in the augmented reality display, and rendering the augmented reality display onto a user's eyes while incorporating the dark source by introducing laser pulsed into the user's eyes to temporarily reduce photosensitivity of the user's eyes relative to the at least one region of the plurality of regions in the augmented reality display.

Example 9: The method of Example 8, further including determining a viewing direction of the user's eyes relative to an environment surrounding an augmented reality device worn by the user.

Example 10: The method of any of Examples 8 and 9, further including determining light levels of a surrounding environment.

Example 11: The method of any of Examples 8-10, wherein the dark source comprises an additional channel in an RGB augmented reality projector housed within an augmented reality device worn by the user.

Example 12: The method of any of Examples 8-11, wherein the at least one region of the plurality of regions in the augmented reality display corresponds to placement of one or more virtual reality objects within the augmented reality display.

Example 13: The method of any of Examples 8-12, wherein applying a dark source to the at least one region of the plurality of regions in the augmented reality display comprises applying the dark source such that a dim halo appears to exist around the one or more virtual reality objects while a remainder of a surrounding environment appears unchanged within the augmented reality display.

Example 14: The method of any of Examples 8-13, further including decreasing a brightness level of one or more additional regions of the augmented reality display such that all regions of the augmented reality display are evenly illuminated.

Example 15: A non-transitory computer-readable medium for intelligently modulating the photosensitivity of a user's eyes can include one or more computer-executable instructions that, when executed by at least one processor of a computing device, cause the computing device to perform various acts. For example, the one or more computer-executable instructions may cause the computing device to generate an augmented reality display comprising a plurality of regions, apply a dark source to at least one region of the plurality of regions in the augmented reality display, and render the augmented reality display onto a user's eyes while incorporating the dark source by introducing laser pulsed into the user's eyes to temporarily reduce photosensitivity of the user's eyes relative to the at least one region of the plurality of regions in the augmented reality display.

Example 16: The non-transitory computer-readable medium of Example 15, further including one or more computer-executable instructions that, when executed by the at least one processor of the computing device, cause the computing device to determine a viewing direction of the user's eyes relative to an environment surrounding an augmented reality device worn by the user.

Example 17: The non-transitory computer-readable medium of any of Examples 15 and 16, further including one or more computer-executable instructions that, when executed by the at least one processor of the computing device, cause the computing device to determine light levels of a surrounding environment.

Example 18: The non-transitory computer-readable medium of any of Examples 15-17, wherein the dark source comprises an additional channel in an RGB augmented reality projector housed within an augmented reality device worn by the user.

Example 19: The non-transitory computer-readable medium of any of Examples 15-18, wherein the at least one region of the plurality of regions in the augmented reality display corresponds to placement of one or more virtual reality objects within the augmented reality display.

Example 20: The non-transitory computer-readable medium of any of Examples 15-19, further including one or more computer-executable instructions that, when executed by the at least one processor of the computing device, cause the computing device to decrease a brightness level of one or more additional regions of the augmented reality display such that all regions of the augmented reality display are evenly illuminated.

Embodiments of the present disclosure may include or be implemented in-conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620 (G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620 (D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

Artificial-reality systems may include a variety of types of visual feedback mechanisms. For example, display devices in augmented-reality system 600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

FIG. 7 is an illustration of an exemplary system 700 that incorporates an eye-tracking subsystem capable of tracking a user's eye(s). As depicted in FIG. 7, system 700 may include a light source 702, an optical subsystem 704, an eye-tracking subsystem 706, and/or a control subsystem 708. In some examples, light source 702 may generate light for an image (e.g., to be presented to an eye 701 of the viewer). Light source 702 may represent any of a variety of suitable devices. For example, light source 702 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 704 may receive the light generated by light source 702 and generate, based on the received light, converging light 720 that includes the image. In some examples, optical subsystem 704 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 720. Further, various mechanical couplings may serve to maintain the relative spacing and/or the orientation of the optical components in any suitable combination.

In one embodiment, eye-tracking subsystem 706 may generate tracking information indicating a gaze angle of an eye 701 of the viewer. In this embodiment, control subsystem 708 may control aspects of optical subsystem 704 (e.g., the angle of incidence of converging light 720) based at least in part on this tracking information. Additionally, in some examples, control subsystem 708 may store and utilize historical tracking information (e.g., a history of the tracking information over a given duration, such as the previous second or fraction thereof) to anticipate the gaze angle of eye 701 (e.g., an angle between the visual axis and the anatomical axis of eye 701). In some embodiments, eye-tracking subsystem 706 may detect radiation emanating from some portion of eye 701 (e.g., the cornea, the iris, the pupil, or the like) to determine the current gaze angle of eye 701. In other examples, eye-tracking subsystem 706 may employ a wavefront sensor to track the current location of the pupil.

Any number of techniques can be used to track eye 701. Some techniques may involve illuminating eye 701 with infrared light and measuring reflections with at least one optical sensor that is tuned to be sensitive to the infrared light. Information about how the infrared light is reflected from eye 701 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 706 may be digitized (i.e., converted to an electronic signal). Further, the sensor may transmit a digital representation of this electronic signal to one or more processors (for example, processors associated with a device including eye-tracking subsystem 706). Eye-tracking subsystem 706 may include any of a variety of sensors in a variety of different configurations. For example, eye-tracking subsystem 706 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 706 to track the movement of eye 701. In another example, these processors may track the movements of eye 701 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 706 may be programmed to use an output of the sensor(s) to track movement of eye 701. In some embodiments, eye-tracking subsystem 706 may analyze the digital representation generated by the sensors to extract eye rotation information from changes in reflections. In one embodiment, eye-tracking subsystem 706 may use corneal reflections or glints (also known as Purkinje images) and/or the center of the eye's pupil 722 as features to track over time.

In some embodiments, eye-tracking subsystem 706 may use the center of the eye's pupil 722 and infrared or near-infrared, non-collimated light to create corneal reflections. In these embodiments, eye-tracking subsystem 706 may use the vector between the center of the eye's pupil 722 and the corneal reflections to compute the gaze direction of eye 701. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 706 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 701 may act as a retroreflector as the light reflects off the retina, thereby creating a bright pupil effect similar to a red-eye effect in photography. If the illumination source is offset from the optical path, then the eye's pupil 722 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 708 may control light source 702 and/or optical subsystem 704 to reduce optical aberrations (e.g., chromatic aberrations and/or monochromatic aberrations) of the image that may be caused by or influenced by eye 701. In some examples, as mentioned above, control subsystem 708 may use the tracking information from eye-tracking subsystem 706 to perform such control. For example, in controlling light source 702, control subsystem 708 may alter the light generated by light source 702 (e.g., by way of image rendering) to modify (e.g., pre-distort) the image so that the aberration of the image caused by eye 701 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 8 is a more detailed illustration of various aspects of the eye-tracking subsystem illustrated in FIG. 7. As shown in this figure, an eye-tracking subsystem 800 may include at least one source 804 and at least one sensor 806. Source 804 generally represents any type or form of element capable of emitting radiation. In one example, source 804 may generate visible, infrared, and/or near-infrared radiation. In some examples, source 804 may radiate non-collimated infrared and/or near-infrared portions of the electromagnetic spectrum towards an eye 802 of a user. Source 804 may utilize a variety of sampling rates and speeds. For example, the disclosed systems may use sources with higher sampling rates in order to capture fixational eye movements of a user's eye 802 and/or to correctly measure saccade dynamics of the user's eye 802. As noted above, any type or form of eye-tracking technique may be used to track the user's eye 802, including optical-based eye-tracking techniques, ultrasound-based eye-tracking techniques, etc.

Sensor 806 generally represents any type or form of element capable of detecting radiation, such as radiation reflected off the user's eye 802. Examples of sensor 806 include, without limitation, a charge coupled device (CCD), a photodiode array, a complementary metal-oxide-semiconductor (CMOS) based sensor device, and/or the like. In one example, sensor 806 may represent a sensor having predetermined parameters, including, but not limited to, a dynamic resolution range, linearity, and/or other characteristic selected and/or designed specifically for eye tracking.

As detailed above, eye-tracking subsystem 800 may generate one or more glints. As detailed above, a glint 803 may represent reflections of radiation (e.g., infrared radiation from an infrared source, such as source 804) from the structure of the user's eye. In various embodiments, glint 803 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 8 shows an example image 805 captured by an eye-tracking subsystem, such as eye-tracking subsystem 800. In this example, image 805 may include both the user's pupil 808 and a glint 810 near the same. In some examples, pupil 808 and/or glint 810 may be identified using an artificial-intelligence-based algorithm, such as a computer-vision-based algorithm. In one embodiment, image 805 may represent a single frame in a series of frames that may be analyzed continuously in order to track the eye 802 of the user. Further, pupil 808 and/or glint 810 may be tracked over a period of time to determine a user's gaze.

In one example, eye-tracking subsystem 800 may be configured to identify and measure the inter-pupillary distance (IPD) of a user. In some embodiments, eye-tracking subsystem 800 may measure and/or calculate the IPD of the user while the user is wearing the artificial reality system. In these embodiments, eye-tracking subsystem 800 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspects of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 700 and/or eye-tracking subsystem 800 may be incorporated into augmented-reality system 600 in FIG. 6 to enable these systems to perform various eye-tracking tasks (including one or more of the eye-tracking operations described herein).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A subtractive contrast system comprising:
    a light source that introduces subtractive contrast using laser pulses directed into a user's eyes to temporarily reduce photosensitivity of the user's eyes;
    a steering mechanism that applies the subtractive contrast to one or more regions of an augmented reality display;
    a rendering pipeline that renders the augmented reality display onto the user's eyes while incorporating the subtractive contrast; and
    at least one processor for implementing the rendering pipeline and controlling the light source and the steering mechanism.

2. The subtractive contrast system of claim 1, further comprising a gaze estimation subsystem that determines a viewing direction of the user's eyes relative to a surrounding environment.

3. The subtractive contrast system of claim 1, further comprising an environment awareness subsystem that determines light levels of a surrounding environment.

4. The subtractive contrast system of claim 1, wherein the subtractive contrast comprises an additional channel in an RGB augmented reality projector.

5. The subtractive contrast system of claim 1, wherein the steering mechanism applies the subtractive contrast to at least one of the one or more regions of the augmented reality display that correspond to placement of one or more virtual reality objects within the augmented reality display.

6. The subtractive contrast system of claim 5, wherein the steering mechanism applies the subtractive contrast to the at least one of the one or more regions of the augmented reality display that correspond to the placement of the one or more virtual reality objects within the augmented reality display by applying the subtractive contrast such that a dim halo appears to exist around the one or more virtual reality objects while a remainder of a surrounding environment appears unchanged within the augmented reality display.

7. The subtractive contrast system of claim 1, further comprising an additive contrast subsystem that decreases a brightness level of one or more additional regions of the augmented reality display such that all regions of the augmented reality display are evenly illuminated by the subtractive contrast in concert with the additive contrast subsystem.

8. A computer-implemented method comprising:

generating an augmented reality display comprising a plurality of regions;

applying a subtractive contrast to at least one region of the plurality of regions in the augmented reality display; and rendering the augmented reality display onto a user's eyes while incorporating the subtractive contrast by introducing laser pulses into the user's eyes to temporarily reduce photosensitivity of the user's eyes relative to the at least one region of the plurality of regions in the augmented reality display.

9. The computer-implemented method of claim 8, further comprising determining a viewing direction of the user's eyes relative to an environment surrounding an augmented reality device worn by the user.

10. The computer-implemented method of claim 8, further comprising determining light levels of a surrounding environment.

11. The computer-implemented method of claim 8, wherein the subtractive contrast comprises an additional channel in an RGB augmented reality projector housed within an augmented reality device worn by the user.

12. The computer-implemented method of claim 8, wherein the at least one region of the plurality of regions in the augmented reality display corresponds to placement of one or more virtual reality objects within the augmented reality display.

13. The computer-implemented method of claim 12, wherein applying the subtractive contrast to the at least one region of the plurality of regions in the augmented reality display comprises applying the subtractive contrast such that a dim halo appears to exist around the one or more virtual reality objects while a remainder of a surrounding environment appears unchanged within the augmented reality display.

14. The computer-implemented method of claim 8, further comprising decreasing a brightness level of one or more additional regions of the augmented reality display such that all regions of the augmented reality display are evenly illuminated.

15. A non-transitory computer-readable medium comprising one or more computer-executable instructions that, when executed by at least one processor of a computing device, cause the computing device to:

generate an augmented reality display comprising a plurality of regions;

apply a subtractive contrast to at least one region of the plurality of regions in the augmented reality display; and render the augmented reality display onto a user's eyes while incorporating the subtractive contrast by introducing laser pulses into the user's eyes to temporarily reduce photosensitivity of the user's eyes relative to the at least one region of the plurality of regions in the augmented reality display.

16. The non-transitory computer-readable medium of claim 15, further comprising one or more computer-executable instructions that, when executed by the at least one processor of the computing device, cause the computing device to determine a viewing direction of the user's eyes relative to an environment surrounding an augmented reality device worn by the user.

17. The non-transitory computer-readable medium of claim 15, further comprising one or more computer-executable instructions that, when executed by the at least one processor of the computing device, cause the computing device to determine light levels of a surrounding environment.

18. The non-transitory computer-readable medium of claim 15, wherein the subtractive contrast comprises an additional channel in an RGB augmented reality projector housed within an augmented reality device worn by the user.

19. The non-transitory computer-readable medium of claim 15, wherein the at least one region of the plurality of regions in the augmented reality display corresponds to placement of one or more virtual reality objects within the augmented reality display.

20. The non-transitory computer-readable medium of claim 19, further comprising one or more computer-executable instructions that, when executed by the at least one processor of the computing device, cause the computing device to decrease a brightness level of one or more additional regions of the augmented reality display such that all regions of the augmented reality display are evenly illuminated.

* * * * *